United States Patent
Cicansky

(10) Patent No.: US 6,729,652 B2
(45) Date of Patent: May 4, 2004

(54) VEHICLE MUD FLAP

(75) Inventor: Joseph Cicansky, Regina (CA)

(73) Assignee: Cloud-Rider Designs, Regina (CA)

( * ) Notice: Subject to any disclaimer, the term of this patent is extended or adjusted under 35 U.S.C. 154(b) by 38 days.

(21) Appl. No.: 10/025,619

(22) Filed: Dec. 26, 2001

(65) Prior Publication Data

US 2002/0043797 A1 Apr. 18, 2002

(51) Int. Cl.⁷ ................................................ B62B 9/14
(52) U.S. Cl. ....................... 280/847; 280/848; 280/851; 280/154; 280/152.3
(58) Field of Search ................................ 280/847, 850, 280/851, 848, 849, 154, 155, 156, 157, 152.05, 152.3

(56) References Cited

U.S. PATENT DOCUMENTS

| | | | | |
|---|---|---|---|---|
| 3,051,508 A | * | 8/1962 | Federspiel | 280/851 |
| 3,285,624 A | * | 11/1966 | Aber et al. | 280/851 |
| 3,473,825 A | * | 10/1969 | Ochs | 280/851 |
| 3,497,238 A | * | 2/1970 | Carlton | 280/851 |
| 3,582,108 A | * | 6/1971 | Carlton | 280/851 |
| 3,650,543 A | * | 3/1972 | Evans | 280/851 |
| 4,013,302 A | * | 3/1977 | Oswald | 280/851 |
| 4,382,606 A | * | 5/1983 | Lightle et al. | 280/851 |
| 4,796,906 A | * | 1/1989 | Sullivan | 280/851 |
| 5,050,908 A | * | 9/1991 | Betts | 280/851 |
| 5,326,135 A | * | 7/1994 | Nakayama et al. | 280/850 |
| 5,833,283 A | * | 11/1998 | Shaw | 293/117 |
| 6,013,351 A | * | 1/2000 | Mahn, Jr. | 428/195 |
| 6,152,469 A | * | 11/2000 | Gadowski | 280/154 |
| 2002/0074790 A1 | * | 6/2002 | Heem | 280/851 |
| 2002/0109347 A1 | * | 8/2002 | Sheppard | 280/851 |
| 2003/0116957 A1 | * | 6/2003 | Cicansky | 280/848 |
| 2003/0151243 A1 | * | 8/2003 | Horinek | 280/848 |

FOREIGN PATENT DOCUMENTS

| | | | |
|---|---|---|---|
| CA | 1275131 | 10/1990 | |
| CA | 2114126 | 2/1993 | |
| GB | 0112694 A1 | * 12/1982 | ........... B62D/25/18 |

* cited by examiner

Primary Examiner—Brian L. Johnson
Assistant Examiner—J. Allen Shriver
(74) Attorney, Agent, or Firm—Ryan W. Dupuis; Adrian D. Battison; Michael R. Williams

(57) ABSTRACT

A mud flap is provided for a vehicle which comprises a panel member of rubber having a top mounting end for securement within the wheel well of a vehicle, a bottom free end having a metallic accent plate supported thereon and respective inner and outer sides extending between the ends of the panel member. Means are provided to protect the metallic accent plate from being dented by rocks thrown onto the mud flap from between a pair of dual wheels for which the mud flap is intended to be used. In one embodiment, stiffener members are provided to prevent denting of an accent plate which extends fully across the panel member. In another embodiment, the accent plate is protected from denting by providing a flexible central portion in the mud flap in alignment with the mating surfaces of the dual wheels to allow the mud flap and accent plates supported thereon to return to an unflexed and unbent position after a rock has been thrown against the mud flap.

16 Claims, 5 Drawing Sheets

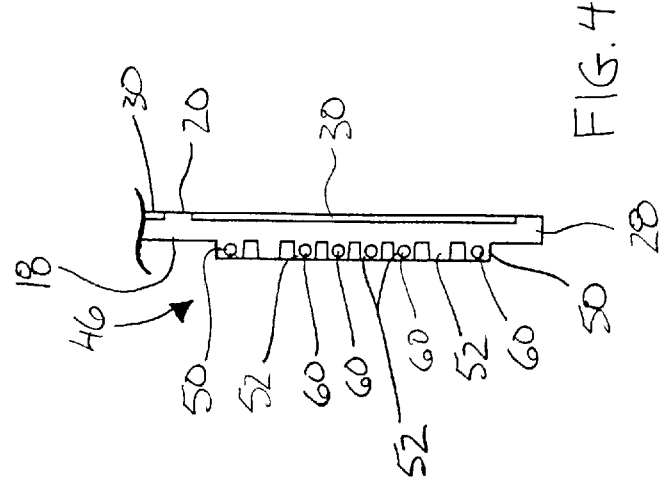
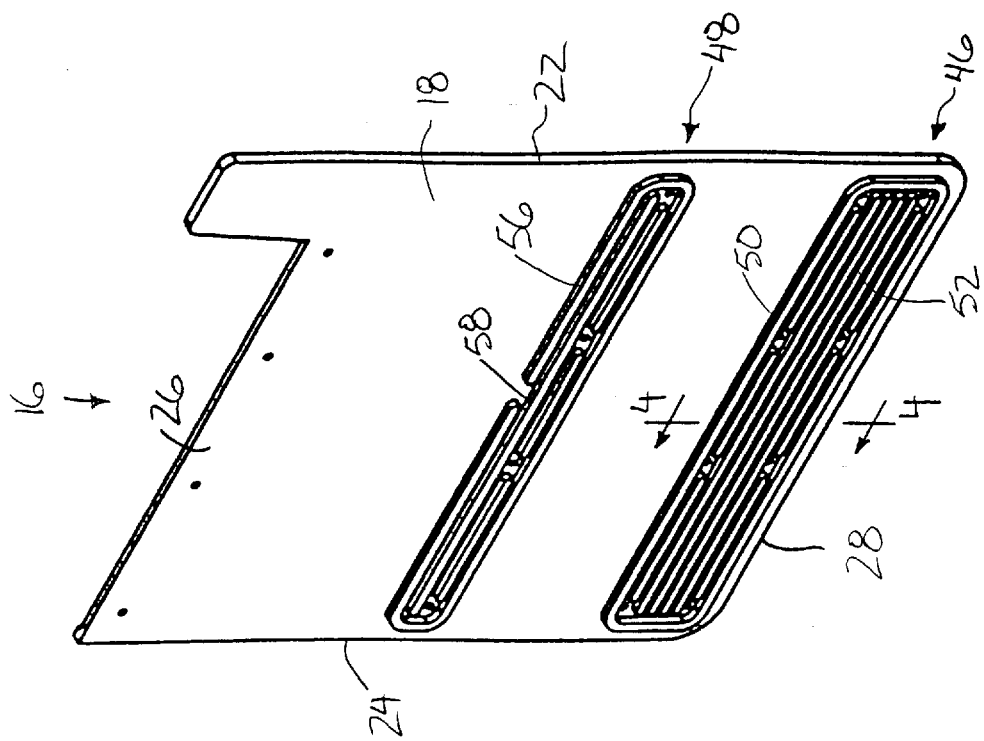

VEHICLE MUD FLAP

FIELD OF THE INVENTION

The present invention relates to a mud flap and more particularly to a mud flap for use with a vehicle having a dual set of wheels.

BACKGROUND

When supporting a mud flap on a vehicle, the mud flaps are known to be subjected to significant abuse due to rocks and other debris being thrown from the wheels onto the mud flaps. This particularly occurs on mud flaps which are supported in the wheel well of a vehicle supporting coaxial dual wheels therein. The flexing and unflexing of the tires of the dual wheels when rotating act to pick up rocks and other debris which are then thrown rearwardly into the mud flaps. This abuse endured by the mud flaps from such debris is particularly evident on mud flaps having metallic inserts used either for precision mounting of the mud flaps on the vehicle or for aesthetic appearance, as these metallic inserts are often dented and deformed. Deformation also occurs due to wind resistance which acts to bend the portion of the mud flap projecting downwardly and outwardly from the side walls of the vehicle.

SUMMARY

According to the present invention there is provided a mud flap for a vehicle comprising:

- a panel member having a top mounting end, a bottom free end and respective inner and outer sides extending between the ends;
- mounting means for securing the top mounting end of the panel member to the vehicle;
- a metallic accent plate spanning partway across the panel member; and
- means for resisting deformation of the metallic accent plate.

The means for resisting deformation of the metallic accent plate provides an economical way of using metallic inserts for aesthetics or for precision mounting of the mud flaps without requiring excessively thick or heavy gauges of sheet metal to be used. In one embodiment, stiffener members are provided to prevent denting of an accent plate by strengthening the mud flap. In another embodiment, the accent plate is protected from denting by providing a flexible central portion in the mud flap in alignment with the mating surfaces of the dual wheels to allow the mud flap and accent plates supported thereon to return to an unflexed and unbent position after a rock has been thrown against the mudflap.

In one embodiment, the means for resisting deformation of the metallic accent plate comprises lateral stiffening means for stiffening the panel member in a lateral direction extending between the respective sides of the panel member.

The lateral stiffening means may include providing ribs formed in the metallic accent plate to extend laterally across the plate, orienting fibres of the rubber material forming the panel member to extend primarily in the lateral direction, providing raised ribs formed integrally on the panel member which extend in the lateral direction or providing elongate stiffening members which are embedded in the panel member to extend in the lateral direction.

When providing elongate stiffening members which are embedded in the panel member to extend in the lateral direction, the elongate stiffening members may comprise fibreglass rods. Furthermore, the elongate stiffening members may be embedded within the raised ribs.

Stiffening members may be located adjacent the bottom free end of the panel member to extend in the lateral direction across the panel member. Preferably, these stiffening members are centrally located between respective sides of the panel member for resisting bending due to rocks thrown from between the wheels of a dual wheel set.

Stiffening members may also be located intermediate the ends of the panel member to extend in the lateral direction across the panel member. Preferably, these stiffening members intermediate the ends of the panel member are located adjacent the outer side of the panel member to resist bending against the vehicle body due to wind resistance.

When used for a vehicle having a wheel well with a dual pair of wheels supported therein, the mounting means are preferably arranged to support the panel member within the wheel well rearwardly of the wheels.

In an alternative embodiment, the means for resisting deformation of the metallic accent plate may comprise a flexible central portion of the mud flap adjacent the bottom free end of the panel member permitting the outer side of the panel member to be deflected in relation to the inner side of the panel member.

In this instance, there may be provided a pair of metallic accent plates, each spanning partway across the panel member on opposing sides of the flexible central portion.

When a flexible central portion is provided, the mounting means are preferably arranged to support the panel member within the wheel well with the flexible central portion aligned with an intersection between the pair of wheels.

BRIEF DESCRIPTION OF THE DRAWINGS

In the accompanying drawings, which illustrate exemplary embodiments of the present invention:

FIG. 3 is an isometric view of a front side of the mud flap according to FIG. 1.

FIG. 4 is a sectional view along the line 4—4 of FIG. 3.

DETAILED DESCRIPTION

Figure 2:
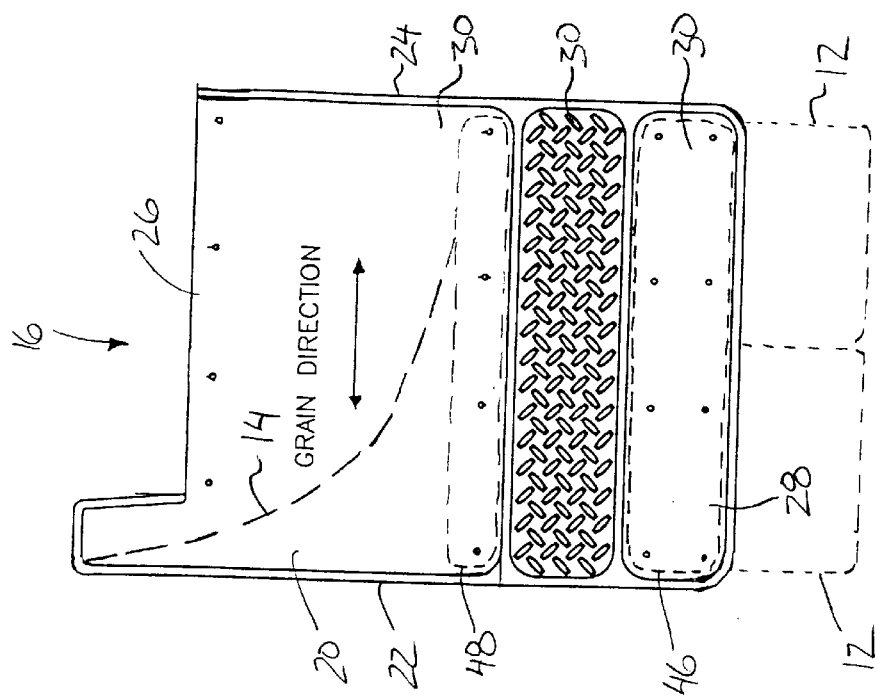
FIG. 2 is a front elevational view of the mud flap according to FIG. 1.

Referring to the accompanying drawings, there is illustrated a mud flap generally indicated by reference numeral 10. The mud flap 10 is intended for use with a vehicle as in conventional mud flaps. The mud flap 10 is particularly suited for vehicles having at least one set of co-axial dual wheels 12 supported within a wheel well of a body 14 of the vehicle. In the illustrated embodiments, only a driver side model is shown, however the passenger side embodiment is a mirror image of the driver side embodiments shown.

As various embodiments of the mud flap 10 are illustrated, only the common elements will first be described herein. The mud flap 10 generally comprises a panel member 16 which is molded of a flexible rubber material having a substantially flat front side 18 and backside 20. The panel member 16 is preferably molded with a grain direction being oriented to extend in a lateral direction across the panel member between a respective outer side 22 and an inner side 24 to increase bending strength between respective sides of the panel members.

A top mounting end 26 of the panel member 16 is arranged to be supported on the vehicle while a bottom free end 28 is arranged to be suspended from the vehicle rearwardly of the wheels 12 as in conventional mud flaps. A width of the panel member 16 is arranged to be only slightly wider than the width of a standard dual set of wheels for which the mud flap is to be used. The outer side 22 of the panel member is arranged to be positioned adjacent an outer side wall of the vehicle body 14 when mounted on the vehicle so that the panel member 16 projects outwardly below the body 14. The outer side 22 of the panel member is also raised upwardly into the wheel well of the vehicle in relation to the inner side 24.

The backside 20 of the panel member includes a plurality of recesses 30 molded integrally therein. An upper one of the recesses 30 is generally rectangular in shape, spanning an upper half of the panel member 16 for receiving a mounting plate 32 which is formed to fit precisely within the upper one of the recesses 30. One or more lower recesses are provided adjacent the bottom free end 28 of the panel member for receiving respective accent plates 34 therein. The accent plates 34 are similarly arranged to mate within the respective recesses, having similar size and shape. One or more decorative intermediate recesses 30 is also provided spaced between respective ends of the panel member.

The mounting and accent plates are all formed of a polished metallic material such as stainless steel or aluminium before being fastened to the panel member 16 formed of rubber material. The plates 32 and 34 are first glued within the respective recesses 30 after cleaning the surface of the rubber material of the panel member. Fasteners are then used in the corners of each of the plates and at spaced lateral positions across the respective plates for adequately securing the plates to the panel member 16.

The mounting plate 32 of each mud flap includes a bottom end 36 which is secured to the panel member 16 at a spaced position intermediate the ends of the panel member so as to be located adjacent a bottom of the side wall of the vehicle body 14 when the mud flap 10 is supported on the vehicle. The mounting plate 32 extends substantially a full width of the panel member 16 with a top end 36 being aligned and fastened to the top mounting end 26 of the panel member. The top end 38 of the mounting plate includes a mounting bracket portion 40 having various flanges and mounting apertures therein which are arranged to mate with the wheel well of a vehicle for which the mud flap 10 is intended to be used.

Figure 6:
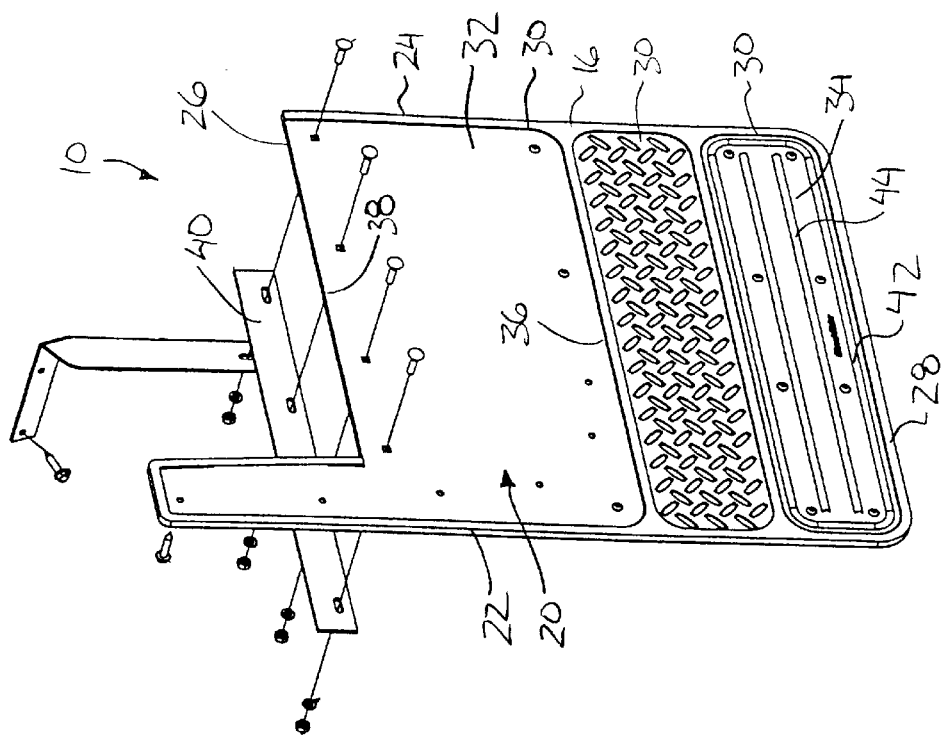
FIG. 6 is an isometric view of a rear side of another embodiment of a mud flap according to the present invention.
Figure 5:
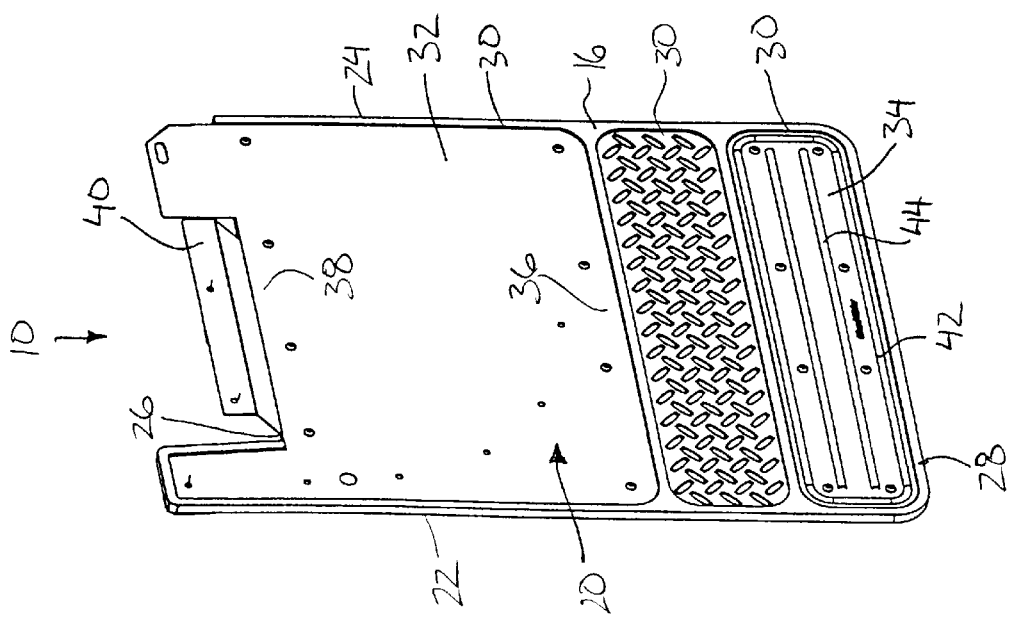
FIG. 5 is an isometric view of a rear side of an alternative embodiment of a mud flap according to the present invention.

In the embodiment of FIGS. 1 through 4, the mounting bracket portion 40 is arranged to be secured within the wheel well of a current model Dodge truck having dual sets of rear wheels. Similarly, FIGS. 5 and 6 illustrate mounting bracket portions 40 which are arranged to mate within the wheel wells of a current model General Motors heavy-duty truck and a current model Ford super-duty truck respectively, both having dual sets of rear wheels. The mounting bracket portion 40 of the mud flap 10 of FIGS. 7 and 8 comprises respective universal mounting apertures located within a blunt flat top of the mounting plate for universal mounting on various types of trucks having dual sets of rear wheels.

Turning now to FIGS. 1 through 6, these embodiments will now be described in further detail. In each of these embodiments a single lower accent plate 34 is provided which is elongate, extending laterally across the panel member 16 between respective sides thereof adjacent the bottom free end 28 of the panel members. A raised perimeter rib 42 is formed in the metallic accent plate 34 about a perimeter thereof and a pair of raised lateral ribs 44 are formed in the metal to extend laterally across the plate, both to act as stiffening members for increasing the bending strength of the accent plate in the lateral direction of the panel member extending between opposing sides thereof. The ribs are formed by pressing the plates in a cold working operation for additionally stiffening the material.

Additional stiffener members for increasing the bending strength in the lateral direction of the panel member are provided in the form of raised integral ribs which are molded integrally with the rubber material of the panel member 16 to project outwardly from the forward face of the panel member. These ribs include a lower set 46 adjacent the bottom free end 28 of the panel member and an intermediate set 48 spaced between respective ends of the panel member. The ribs which are integrally formed on the panel member are located on a front side of the panel member opposite respective plates 32 and 34 on the backside 20 of the panel member.

The lower set of integral ribs includes a perimeter rib 50 which is substantially in alignment with the perimeter rib 42 of the accent plate 34. A series of lateral ribs 52 are formed within the perimeter rib 50 to extend laterally across the panel member adjacent the bottom free end 28 thereof similarly to the lateral ribs 44 on the backside of the panel member. Gaps in the lateral ribs 52 are provided as required for accommodating fasteners which secure the accent plate 34 onto the panel member.

Figure 1:
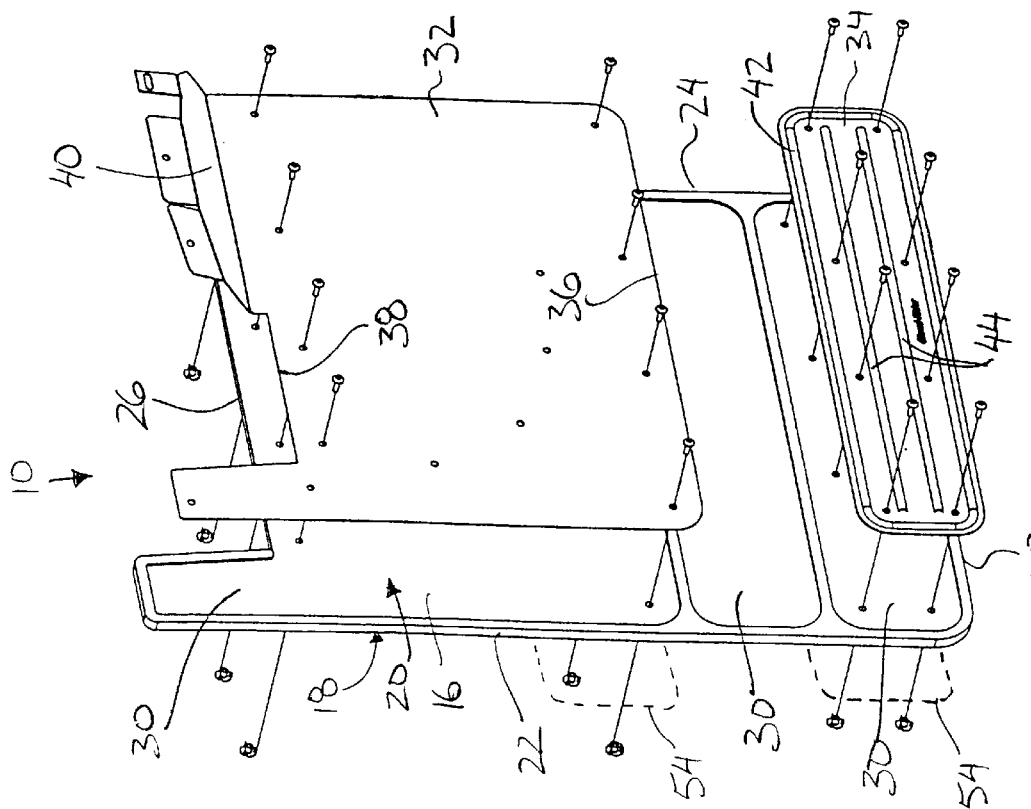
FIG. 1 is an isometric view of a rear side of a mud flap for a vehicle having dual wheels.

In an alternate embodiment the lower set 46 or possibly both the lower and intermediate sets of integral ribs may be replaced by additional metallic plates 54 which are secured to the front side 18 of the panel member in alignment with the respective plates 32 and 34 on the backside thereof, as shown in dotted line in FIG. 1. The metal plates 54 would be similar in shape and configuration to the plates 32 and 34 mounted on the backside of the panel member and may additionally include respective ribs therein for additional stiffening in the lateral direction as required.

The intermediate set of integral ribs are similarly molded integrally with the panel member 16 to be raised from the front side thereof as in the lower set 46. The intermediate set 48 similarly includes a perimeter rib 56 which defines the perimeter of an elongate rectangular area spanning laterally across the panel member adjacent the bottom end of the mounting plate 32 on an opposite side of the panel member for alignment with a bottom end of the vehicle body 14 to which the mud flap 10 is secured. One or more lateral ribs 58 are provided within the perimeter rib 56 to similarly span laterally across the panel member for additional stiffening in the lateral direction. By locating the intermediate set 48 of integral ribs adjacent the bottom of the body 14 of the vehicle at a location where the side wall of the vehicle curves inwardly at the bottom end thereof as shown in dotted line in FIG. 2, the integral ribs of the intermediate set 48 are suitably arranged to resist bending of the mounting plate 32 against the vehicle body otherwise due to wind resistance and the like.

Additional stiffening members may be provided in the form of fiberglass rods 60 which can be embedded within the rubber material of the panel member 16 to extend laterally across the panel member between respective inner and outer sides thereof. In a preferred arrangement as shown in cross section in FIG. 4, the rods 60 are preferably located within the lateral ribs 52 and 58 of the integral ribs as well as within the lateral extents of the perimeter ribs 50 and 56. The rods 60 may be formed integrally within the integral ribs when the panel members 16 are molded. The rods 60 within the intermediate set 48 of the integral ribs are located adjacent the outer side 22 of the panel member where the most bending strength is required for wind resistance against the vehicle body, however the rods may extend the full width of the ribs within which they are mounted. The rods 60 located within the lower set 46 extend at least across a central portion of the mud flap for stiffening a point of engagement of rocks being thrown from between the dual wheels 12, however these rods 60 may also be arranged to extend the full width of the panel member 16 or the ribs within which they are embedded.

Figure 8:
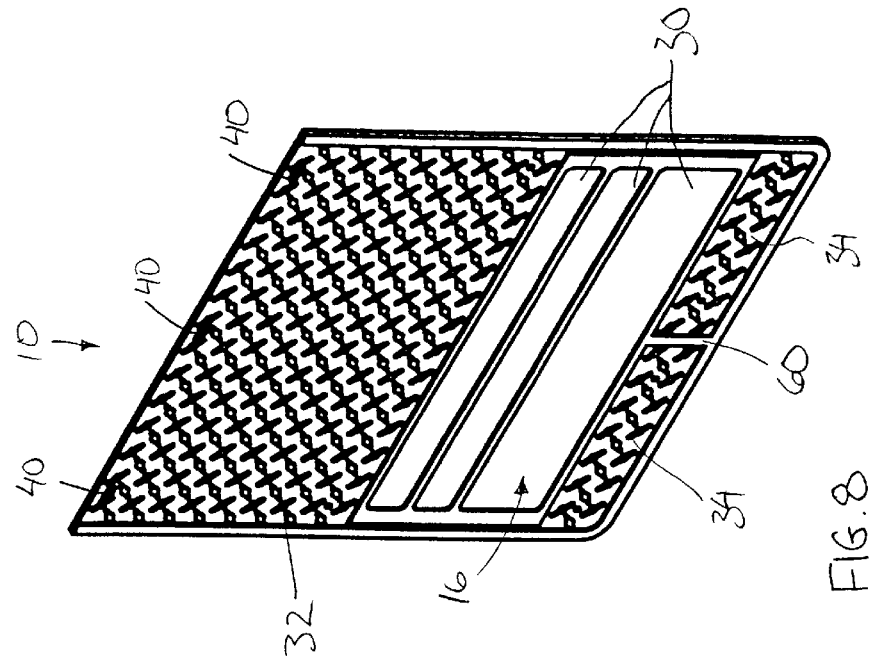
FIG. 8 is an isometric view of a rear side of the mud flap according to FIG. 7 with respective plates mounted thereon.
Figure 7:
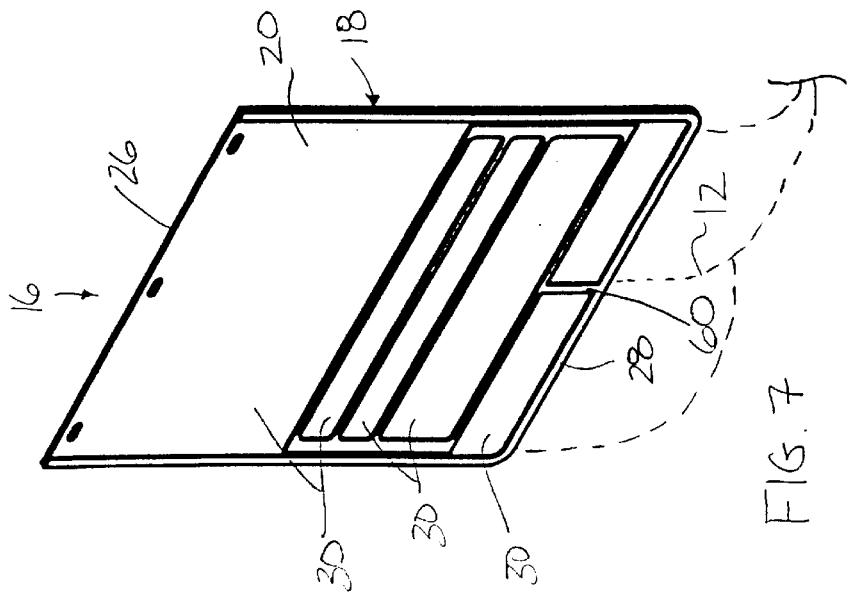
FIG. 7 is an isometric view of a rear side of a yet another embodiment of a mud flap according to the present invention

Turning now to FIGS. 7 and 8 an alternate arrangement to prevent denting of the accent plates 34 is provided. As shown in FIG. 8 a pair of accent plates 34 are provided across the bottom free end 28 of the panel member, being spaced apart on opposing sides of a flexible central portion 62. The flexible central portion 62 permits deflection of the inner and outer sides of the panel member at the bottom free end 28 in relation to one another so that deformation of the mud flap 10 resulting from rocks being thrown at the central portion 62 results in the panel member 16 returning to a flat and unflexed position due to the resilient nature of the rubber material forming the panel member. The mounting plate in this instance is a simple rectangular plate having mounting apertures in the top mounting end 26 thereof which are generally elongate in the lateral direction of the panel member for universal mounting onto a vehicle so as to permit the flexible central portion 62 of the mud flap to be aligned with the intersection of the mating surfaces of a dual set of wheels of the vehicle.

Figure 10:
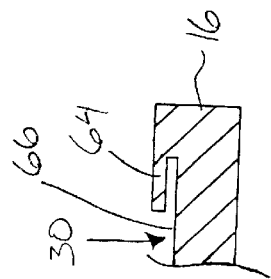
FIG. 10 is a sectional view along the line 10—10 of FIG. 9.
Figure 9:
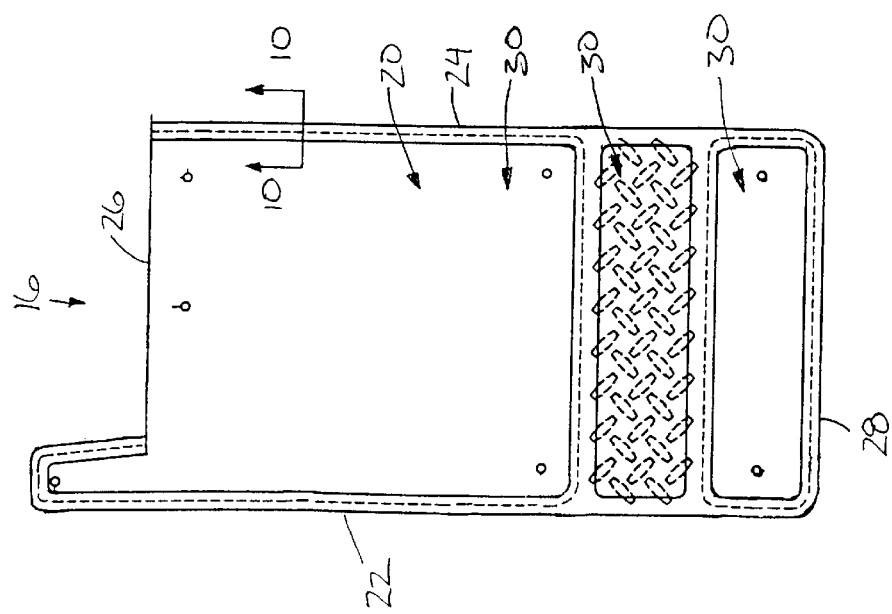
FIG. 9 is a rear elevational view of another embodiment of a mud flap.

Turning now to FIGS. 9 and 10, an additional embodiment of a mud flap 10 is illustrated. The panel member 16 in this instance is shown with the plates 32 and 34 removed therefrom to expose the recesses 30 which are arranged to receive the plates. Similarly to previous embodiments the recesses 30 in this instance comprise a flat area which is reduced in thickness, being generally rectangular in shape for receiving a mating plate therein. The recesses of the embodiment of FIGS. 9 and 10 differs from previous embodiments however in that there is provided a peripheral lip 64 which extends about a full perimeter of a lowermost recess 30 and which extends about at least three sides of an uppermost recess 30. The peripheral lip 64 generally comprises a flange of material which extends inwardly from a periphery of the recess spaced outwardly from an inner surface 66 of the recess for receiving the perimeter of a plate engaged between the lip 64 and the inner surface 66 in use. The lip 64 prevents debris from accumulating between the plates and the panel member 18 as well as assisting alignment of the plates on the panel member to maintain a desired shaped and form to the mud flap.

While various embodiments of the present invention have been described in the foregoing, it is to be understood that other embodiments are possible within the scope of the invention. The invention is to be considered limited solely by the scope of the appended claims.

What is claimed is:

1. A mud flap for a vehicle comprising:
    a panel member having a top mounting end, a bottom free end and respective inner and outer sides extending between the ends;
    mounting means for securing the top mounting end of the panel member to the vehicle;
    a metallic accent plate spanning partway across the panel member; and
    lateral stiffening means for stiffening the accent plate in a lateral direction extending between the respective sides of the panel member for resisting deformation of the metallic accent plate;
    the lateral stiffening means including raised ribs formed integrally on the panel member which extend in the lateral direction and elongate stiffening members which are embedded in the raised ribs to extend in the lateral direction therewith.

2. The mud flap according to claim 1 wherein the lateral stiffening means includes ribs formed in the metallic accent plate and extending laterally across the plate.

3. The mud flap according to claim 1 wherein the elongate stiffening members comprise fibreglass rods.

4. A mud flap for a vehicle comprising:
    a panel member having a top mounting end, a bottom free end and respective inner and outer sides extending between the ends;
    mounting means for securing the top mounting end of the panel member to the vehicle;
    a metallic accent plate spanning partway across the panel member; and
    lateral stiffening means for stiffening the accent plate in a lateral direction extending between the respective sides of the panel member;
    the lateral stiffening means being formed in the metallic accent plate for resisting deformation of the metallic accent plate.

5. The mud flap according to claim 4 wherein the panel member is formed of rubber material and wherein the lateral stiffening means includes orienting fibres of the rubber material to extend primarily in the lateral direction.

6. The mud flap according to claim 4 wherein the lateral stiffening means includes raised ribs formed integrally on the panel member which extend in the lateral direction.

7. The mud flap according to claim 4 wherein the lateral stiffening means includes elongate stiffening members which are embedded in the panel member to extend in the lateral direction.

8. The mud flap according to claim 7 wherein the lateral stiffening means includes raised ribs formed integrally on the panel member which extend in the lateral direction, the elongate stiffening members being embedded within the raised ribs.

9. The mud flap according to claim 4 wherein the lateral stiffening means includes stiffening members located adjacent the bottom free end of the panel member to extend in the lateral direction across the panel member.

10. The mud flap according to claim 9 wherein the stiffening members at the bottom free end are centrally located between respective sides of the panel member.

11. The mud flap according to claim 4 wherein the lateral stiffening means includes stiffening members located intermediate the ends of the panel member to extend in the lateral direction across the panel member.

12. The mud flap according to claim 11 wherein the stiffening members intermediate the ends of the panel member are located adjacent the outer side of the panel member.

13. The mud flap according to claim 4 wherein the lateral stiffening means includes stiffening members located adjacent the bottom free end and intermediate the ends of the panel member, each arranged to extend in the lateral direction across the panel member.

14. The mud flap according to claim 4 wherein the stiffener members toned in the metallic accent plate are located at a periphery of the metallic accent plate.

15. A mud flap for a vehicle comprising:
   a panel member having a top mounting end, a bottom free end and respective inner and outer sides extending between the ends;
   mounting means for securing the top mounting end of the panel member to the vehicle;
   a metallic accent plate spanning partway across the panel member; and
   lateral stiffening means for stiffening the accent plate in a lateral direction extending generally between the respective sides of the panel member,
   the lateral stiffening means being formed in the metallic accent plate at a periphery of the metallic accent plate for resisting deformation of the metallic accent plate.

16. The mud flap according to claim 4 wherein the lateral stiffening means includes stiffener members formed in the metallic accent plate which extend laterally across the plate.

* * * * *